(12) United States Patent
Miller (10) Patent No.: US 9,469,826 B2
(45) Date of Patent: Oct. 18, 2016

(54) METHOD FOR PROCESSING A VEGETABLE FAT COMPOSITION

(75) Inventor: Rasmus Leth Miller, Viby J (DK)

(73) Assignee: AAK AB (PUBL), Malmö (SE)

( * ) Notice: Subject to any disclaimer, the term of this patent is extended or adjusted under 35 U.S.C. 154(b) by 0 days.

(21) Appl. No.: 14/426,704

(22) PCT Filed: Sep. 7, 2012

(86) PCT No.: PCT/DK2012/050334
§ 371 (c)(1),
(2), (4) Date: Jun. 23, 2015

(87) PCT Pub. No.: WO2014/037006
PCT Pub. Date: Mar. 13, 2014

(65) Prior Publication Data
US 2015/0291909 A1    Oct. 15, 2015

(51) Int. Cl.
| | | |
|---|---|---|
| *C11B 3/06* | (2006.01) | |
| *C11B 3/00* | (2006.01) | |
| *C11B 3/04* | (2006.01) | |
| *C11C 3/08* | (2006.01) | |

(52) U.S. Cl.
CPC .................. *C11B 3/06* (2013.01); *C11B 3/001* (2013.01); *C11B 3/003* (2013.01); *C11B 3/04* (2013.01); *C11C 3/08* (2013.01)

(58) Field of Classification Search
CPC ......... C11B 3/001; C11B 3/003; C11B 3/04; C11B 3/06; C11B 1/025
See application file for complete search history.

(56) References Cited

U.S. PATENT DOCUMENTS

| | | |
|---|---|---|
| 2007/0077635 A1 | 4/2007 | Brunner et al. |
| 2008/0250700 A1 | 10/2008 | Tremblay et al. |
| 2011/0283605 A1 | 11/2011 | Das |

FOREIGN PATENT DOCUMENTS

| | | |
|---|---|---|
| WO | WO 2009/005767 A1 | 1/2009 |
| WO | WO 2011/048083 A1 | 4/2011 |

OTHER PUBLICATIONS

International Search Report of International Application No. PCT/DK2012/050334, dated Jun. 6, 2013.

*Primary Examiner* — Yate K Cutliff
(74) *Attorney, Agent, or Firm* — Finnegan, Henderson, Farabow, Garrett & Dunner (57) ABSTRACT

The invention relates to a method for processing a vegetable fat composition (VFC), the method comprising the steps of:
    providing the vegetable fat composition (VFC);
    in a first neutralization step (FNS) separating free fatty acids from the vegetable fat composition (VFC) thereby obtaining a neutralized vegetable fat composition (NVF);
    in a separation step (FRA) separating the neutralized vegetable fat composition (NVF) into a first fraction (FF) rich in StOO and/or OOO and a second fraction (SF) rich in StOSt (where St=stearic acid and O=oleic acid);
    in a second neutralization step (SNS) adding to the first fraction (FF) a second base (SB) thereby obtaining a neutralized first fraction (NFF);
feeding the neutralized first fraction (NFF) and a stearic acid source (SAS) into an enzymatic transesterification step (ETE) transesterifying the neutralized first fraction (NFF) by using enzymes with 1,3-specific transesterification activity thereby obtaining a transesterified first fraction (TFF).

25 Claims, 5 Drawing Sheets

METHOD FOR PROCESSING A VEGETABLE FAT COMPOSITION

This application is a national stage filing under 35 U.S.C. §371 of international Application No. PCT/DK20121050334 filed on Sep. 7, 2012, the contents of which is incorporated herein by reference.

FIELD OF THE INVENTION

The invention relates to a process according to claim 1.

BACKGROUND OF THE INVENTION

The invention relates to a method for processing a vegetable fat composition. Several problems may exist in relation to such processing being expensive and difficult. Therefore, it is an object of the invention to provide a method for processing a vegetable fat in a cost-effective and efficient way.

SUMMARY OF THE INVENTION

The invention relates to a method for processing a vegetable fat composition, the method comprising the steps of
  providing the vegetable fat composition,
  in a first neutralization step separating free fatty acids from the vegetable fat composition thereby obtaining a neutralized vegetable fat composition,
  in a separation step separating the neutralized vegetable fat composition into a first fraction rich in StOO and/or OOO and a second fraction rich in StOSt (where St=stearic acid and O=oleic acid),
  in a second neutralization step adding to the first fraction a second base thereby obtaining a neutralized first fraction,
  feeding the neutralized first fraction and a stearic acid source into an enzymatic transesterification step of transesterifying the neutralized first fraction by means of enzymes with 1,3-specific transesterification activity, thereby obtaining a transesterified first fraction.

By a said first fraction being rich in StOO and/or OOO is meant that StOO and/OOO comprises a significant part of the first fraction. As an example, such a first fraction may comprise StOO and/or OOO in amount exceeding the content of any other components or types of triglycerides. Also, such a first fraction may comprise more than 40% by weight of StOO and/or OOO, such as more than 50% by weight of StOO and/or OOO, such as more than 60% by weight of StOO and/or OOO. Typically, especially for embodiments where a shea fat is used as the vegetable fat composition, StOO may be dominating, due to the fact that StOO typically will be the lower melting point triglyceride with the highest concentration. Similarly, by a second fraction being rich in StOSt, it may for example comprise StOSt in amount exceeding the content of any other components or types of triglycerides. Also, such a second fraction may comprise more than 40% by weight of StOSt, such as more than 50% by weight of StOSt, such as more than 60% by weight of StOSt, such as more than 70% by weight of StOSt.

By the separation step is meant a process for separating the neutralized vegetable fat composition into the first and second fractions. This separation step may preferably be a fractionation. Preferably such fractionation is a fractional crystallization, which is to be understood as a separation process in which one fraction is separated from another fraction by crystallization. Such fractional crystallization is preferably performed by heating the neutralized vegetable fat composition, preferably until it is completely melted, and then cooling the neutralized vegetable fat composition until the second fraction crystallizes and can be removed from the second fraction, which is a liquid remaining or left-over fraction. By cooling the neutralized vegetable fat composition is to be understood a process, in which the neutralized vegetable fat composition has a lower temperature after the cooling compared to before the cooling, and the cooling may therefore involve temporarily keeping the temperature constant or even raising the temperature. The fractional crystallization preferably involves a solvent, such as adding a solvent before the cooling of the neutralized vegetable fat composition, and preferably before the step of heating the neutralized vegetable fat composition. Also, this solvent is preferably removed from the first and/or second fraction after the separation for the two fractions. The solvent may preferably be hexane or acetone. Alternatively, the separation step may be a distillation step or involve other separation steps, or be a combination of several separation steps.

By performing said first neutralization step, an advantage is achieved in that the separation step may be more efficient, especially when this involves a fractionation step. The fractionation step is more effective when said first neutralization step may be performed, since no or at least very little of free fatty acids are present to disturb the crystallization processes that are essential to the fractionation. Since the fractionation step relies largely on crystallization, it is imperative that the crystallization characteristics of a fat to be fractionated are suitable for fractionation, as opposed to some fats, where a large content of free fatty acids may change the crystallization characteristics and impair the fractionation. However, after performing said first neutralization such free fatty acids are not present in the neutralized vegetable fat composition, at least not at significant levels.

Furthermore, by adding the second base, residues of acids may be removed or reacted, thereby significantly increasing the lifetime of the enzymes. These residues of acids may include acids from storage, bi-products from the fractionation process and/or acids added in the first neutralization step. Especially in embodiments, where the first neutralization step comprises a base adding step or a distilling step it may be advantageous to add an acid before and/or after the base adding step or the distilling step. Therefore, in such embodiments, it is a particular advantage to add the second base, since residues of these acids may then be neutralized. Also, by adding the second base to the first fraction after the fractionation and not to the entire neutralized vegetable fat composition before the fractionation, a lesser amount of neutralized vegetable fat composition has to be neutralized by adding the second base. For example, the neutralized vegetable fat composition may be fractionated approximately 1:1 into a first and a second fraction. In such an example embodiment, only about half the fat has to be neutralized in the second neutralization step. This may be advantageous in both that a smaller amount of second base has to be added, and in that the process equipment only has to handle about half the amount of fat. Furthermore, by performing the second neutralization step with the second base after the fractionation step and before the transesterification step, the time between the second neutralization step and the transesterification step may be reduced, thereby diminishing the build-up of substances that may be harmful to the enzymes; such build-up may otherwise take place over time. Finally, by-products from the fractionation may be handled by or in relation to the second neutralization step, thereby providing a better product.

Therefore, the present invention provides a method for preparing a vegetable fat composition for fractionation, while preparing the lower melting point first fraction from the fractionation to subsequently be subjected to an enzymatic transesterification. Thereby, the lower melting point first fraction, which is a low value part or fraction of the vegetable fat composition, may be enzymatically upgraded, thus increasing the value of this part or fraction significantly.

According to an embodiment of the invention, said first neutralization step comprises the steps of in a base adding step adding a first base to the vegetable fat composition thereby obtaining a base added vegetable fat composition, in a soap separation step separating free fatty acids in the form of saponified free fatty acids from the base added vegetable fat composition thereby obtaining a reduced vegetable fat composition having a reduced content of free fatty acids, and in a soap residue removal step adding a first acid to the reduced vegetable fat composition thereby obtaining the neutralized vegetable fat composition.

By adding the first base to the vegetable fat composition, fatty acids in the vegetable fat composition are saponified, i.e. the fatty acids are converted or transformed into saponified fatty acids, i.e. soaps. It is to be understood that fatty acids refer to free fatty acids, and therefore not fatty acids that form part of e.g. triglycerides.

By adding the first acid to the reduced vegetable fat composition, residues of saponified free fatty acids are converted into free fatty acids.

By performing said base adding step, an advantage in relation to the separation step is achieved. Since the free fatty acids in the vegetable fat composition may have characteristics, which are substantially different from those of the main substances of the vegetable fat composition, namely the triglycerides, it is advantageous to remove these free fatty acids from the vegetable fat composition. Although the base adding step does not remove the free fatty acids, but rather converts them into soaps, it facilitates the subsequent step of removing the free fatty acids in the form of soaps in the soap separation step.

By separating the saponified free fatty acids according to the soap separation step, an advantage is achieved in relation to the separation step, since lowering the concentration of saponified free fatty acids will lower the degree of clogging or blocking of filters used in the separation process of the separation step, thereby increasing the efficiency of the separation process. This advantage is particularly pronounced when the separation step involves a fractionation step. Especially for vegetable fats with large contents of free fatty acids, such as shea fat, and therefore a resulting large content of saponified free fatty acids after the base adding step, such large amounts of soaps must be removed in order for liquid-solid separation in the separation, such as filtering, to be possible. The soap separation step of separating the saponified free fatty acids therefore permits liquid-solid separation in the fractionation step.

Furthermore, by adding a first acid to the vegetable fat composition, and thereby converting or transforming any residues of saponified free fatty acids into free fatty acids, any clogging or blocking of the filters by soaps in the fractionation process will be prevented, the fractionation process therefore being more effective. Such residues of saponified free fatty acids may result in a reduced fractionation capacity, e.g. by partial clogging of fractionation filters or other equipment. Therefore, by adding the first acid, such potential fractionation capacity reduction is eliminated.

Therefore, by performing the steps of adding the first base, then separating the saponified free fatty acids, and then adding the first acid, it is made possible to perform an effective fractionation process since only a very low concentration of free fatty acids is present in the neutralized vegetable fat composition, therefore not disturbing the crystallization processes of the fractionation while at the same time avoiding clogging or blocking of the fractionation filters by saponified free fatty acids. This is a particular advantage of the above described embodiment.

According to the above embodiment, by adding the first base to the vegetable fat composition, it may be made possible to separate the larger part of the saponified free fatty acids, since their solubility in the vegetable fat composition is lowered by the saponification. However, by lowering the solubility in the vegetable fat composition, the saponified free fatty acids may then aggregate on equipment and block narrow passages, such as e.g. filters in the fractionation process, which is highly disadvantageous. This may be a problem even for relatively small amounts of saponified free fatty acids left in the vegetable fat composition by the separation process. This problem is solved, however, by converting the saponified free fatty acids back into free fatty acids by adding the first acid. Thereby, passage blocking by aggregated saponified free fatty acids is avoided, while the relatively small amount of free fatty acids may be insufficient to disturb the fractionation process.

According to an embodiment of the invention, said first neutralization step comprises a distillation step of distilling free fatty acids from the vegetable fat composition thereby obtaining a neutralized vegetable fat composition.

An advantage of the above embodiment is that by removing the free fatty acids or at least the larger part thereof from the vegetable fat composition, the separation efficiency of the subsequent separation may be significantly increased, especially when using fractionation in the separation step.

According to an embodiment of the invention, said first neutralization step furthermore comprises adding a first acid to the vegetable fat composition before the distilling step.

By adding the first acid before the distilling step, the vegetable fat composition has a decreased tendency to discolor during the distilling step. This effect is especially pronounced when a step of bleaching the vegetable fat composition is performed after the addition of the first base, and before the distilling step.

According to an embodiment of the invention, said first neutralization step furthermore comprises adding a first acid to the vegetable fat composition or a product. In various example embodiments, this could e.g. be a pre-treatment step, such as right before e.g. a distilling step, or as a post-treatment step, such as after e.g. adding the first base adding step. Adding the first acid may increase the yield and/or quality of the neutralized vegetable fat.

According to an embodiment of the invention, said first acid is phosphoric acid.

According to alternative embodiments, the first acid may e.g. be citric acid.

According to an embodiment of the invention, said first neutralization step furthermore comprises bleaching said vegetable fat composition before said distilling step.

By bleaching the vegetable fat composition before the distilling step, the vegetable fat composition has a decreased tendency to discolor during the distilling step. This bleaching is preferably performed after step of adding a first base to the vegetable fat composition.

According to an embodiment of the invention, the vegetable fat composition comprises shea fat.

An advantage of the above embodiment is that the process for treatment of the vegetable fat composition according to the invention is particularly suitable for treatment of fats with a high content of free fatty acids, hereunder especially shea fat extracted from shea nuts, and also known as shea oil or shea butter. Only a part of a shea fat being the first fraction being the higher melting point fraction, which may for instance constitute about e.g. half of the shea fat, can be used e.g. as a component in cocoa butter equivalent (CBE). Furthermore, due to a large content of free fatty acids in shea fat, a number of problems related to the separation of the shea fat by fractionation exist. Also, since enzymes used in the enzymatic transesterification process may be fragile and may denaturize or become inactivated and furthermore may be expensive, the part of the shea fat to be transesterified must be processed in order to be enzyme compatible, i.e. to facilitate a satisfactory lifetime of the enzyme, and hence permit a cost-effective process of treatment of the shea fat. However, by solving a single of the above problems may easily induce further problems. However, the process of the present embodiment solves these and other problems and increases the StOSt rich part of a shea fat for use in e.g. a CBE. Particularly, the problems of fractionating a vegetable fat composition comprising free fatty acids and/or soap residues thereof, and the problem of short enzyme lifetime are solved by the invention. Since shea fat has an extraordinary large content of free fatty acids, whereas other fats may have a lower content of free fatty acids, the above mentioned problems and/or other problems associated with free fatty acids may be especially pronounced for shea fat, and therefore the solution to these problems is particularly advantageous for application of the treatment process according to the invention on shea fat.

According to an embodiment of the invention, the vegetable fat composition comprises refined shea fat.

According to an embodiment of the invention, the neutralized first fraction is bleached.

The bleaching may be performed by adding bleaching earth to the neutralized first fraction. Preferably, the step of bleaching is performed after the second neutralization step, and before the enzymatic transesterification step. The bleaching step preferably comprises filtering of the bleaching earth from the neutralized first fraction. An advantage of the above embodiment is that any residues of saponified free fatty acids in the first fraction may be removed in the bleaching step. Such saponified free fatty acids may otherwise have a negative effect on the crystallization characteristics of the first fraction, thereby potentially decreasing the efficiency of subsequent fractionations, such as fractionations after the transesterification, and furthermore such saponified free fatty acids may induce a very bad taste in the first fraction or products comprising part of the first fraction, such as chocolate-products comprising cocoa butter equivalent based on the first fraction and a palm oil mid fraction. Especially if the transesterified first fraction or a part thereof is deodorized, saponified free fatty acids may induce such bad taste in the fat and/or products thereof. A further advantage of the bleaching step is that metal residues in the first fraction, such as metal residues from the fractionation equipment, may be removed in the bleaching step.

Note that a palm oil mid fraction (PMF) may be understood as different palm oil products. Preferably, the PMF should be understood as a hard PMF having an iodine value of 30 to 35, such as 32, 33, or 34. However, in some embodiments, a softer PMF having a higher iodine value of up to e.g. 50 may be usable.

According to an embodiment of the invention, the separation step involves a fractionation step.

Preferably, the fractionation step is a separation process in which one fraction is separated from another fraction by crystallization, i.e. a fractional crystallization. Such fractional crystallization is preferably performed by heating the neutralized vegetable fat composition, preferably until it is completely melted, and then cooling the neutralized vegetable fat composition until the second fraction crystallizes and can be removed from the first fraction, which is a liquid remaining or left-over fraction. By cooling the neutralized vegetable fat composition is to be understood a process, in which the neutralized vegetable fat composition has a lower temperature after the cooling compared to before the cooling, and the cooling may therefore involve keeping the temperature constant or even raising the temperature. In fact, the cooling step may involve multiple cooling and heating steps, and steps of keeping the temperature constant. The fractional crystallization preferably involves a solvent, such as adding a solvent before the cooling of the neutralized vegetable fat composition, and preferably before the step of heating the neutralized vegetable fat composition. Also, this solvent is preferably removed from the first and/or second fraction after the separation for the two fractions. The solvent may preferably be hexane or acetone.

According to an embodiment of the invention, the first base comprises an aqueous solution of NaOH.

Alternatively, the first base may comprise NaOH (sodium hydroxide) in another form, such as in crystalline form, or the second base may comprise other suitable bases in suitable forms, such as aqueous solutions. Such other suitable bases may preferably be foodstuff-compatible strong bases, and may include KOH (potassium hydroxide), or lithium hydroxide (LiOH), or lithium carbonate (Li2CO3), or calcium hydroxide (Ca(OH)2), or barium hydroxide (Ba(OH)2), sodium carbonate (Na2CO3), sodium bicarbonate (NaHCO3), or other suitable bases.

According to an embodiment of the invention, the first base comprises a 50% w/w aqueous solution of NaOH.

Alternatively, the concentration of the first base may be between 5 and 90% w/w, such as between 10 and 70% w/w, such as between 15 and 65% w/w, such as between 15 and 60% w/w, such as between 15 and 55% w/w, for example the concentration of the first base may preferable be 20% w/w.

According to an embodiment of the invention, the amount of the first base added to the vegetable fat composition in the base adding step is based on the amount of free fatty acids in the vegetable fat composition.

According to the above embodiment, the amount of the first base added to the vegetable fat composition is adapted to the amount of free fatty acids in the vegetable fat composition. E.g. by said amount of first base being based on said amount of free fatty acids may be meant that the amount of first base is calculated from the amount of the free fatty acids. The amount of free fatty acids is in this context to be understood as e.g. an estimated value, i.e. a value which may be estimated due to process parameters earlier in the process, type and origin of the vegetable fat composition, when the vegetable fat composition is obtained from its source such as a nut, previously calculated or optimized values, textbook values, or as a measured value, such a value obtained from random samples, regularly performed samples, discrete measurements obtained once every year, month, week, day, hour, minute, second etc., continuous measurements, or other measured values, or as it may be understood as a combination of measured and estimated values. This may e.g. be done by measuring the amounts of free fatty acids in the vegetable fat composition and adapting the amount of the first base based on such measurements. A measurement of the amount of free fatty acids may e.g. be a measurement of the pH-value in the vegetable fat composition and/or in the base added vegetable fat composition.

According to an embodiment of the invention, the amount of the first base added to the vegetable fat composition in the base adding step is based on the acidity of the vegetable fat composition.

According to the above embodiment, the amount of the first base added to the vegetable fat composition is adapted to the amount of acidity of the vegetable fat composition. E.g. by said amount of first base being based on said amount of free fatty acids may be meant that the amount of first base is calculated from the amount of the free fatty acids. The amount of free fatty acids is in this context to be understood as e.g. an estimated value, i.e. a value which may be estimated due to process parameters earlier in the process, type and origin of the vegetable fat composition, when the vegetable fat composition is obtained from its source such as a nut, previously calculated or optimized values, textbook values, or as a measured value, such a value obtained from random samples, regularly performed samples, discrete measurements obtained once every year, month, week, day, hour, minute, second etc., continuous measurements, or other measured values, or as it may be understood as a combination of measured and estimated values. This may e.g. be done by measuring the pH-value in a water phase extracted from the vegetable fat composition and/or in the base added vegetable fat composition and adapting the amount of the first base based on such measurements.

According to an embodiment of the invention, the molar amount of the first base added to the vegetable fat composition in the base adding step is between 0.5 and 3 times the molar amount of the free fatty acids in the vegetable fat composition, such as between 0.8 and 2 times the molar amount of the free fatty acids in the vegetable fat composition, such as between 1 and 2 times the molar amount of the free fatty acids in the vegetable fat composition, such as between 1.2 and 1.4 times the molar amount of the free fatty acids in the vegetable fat composition, such as 1.3 times the molar amount of the free fatty acids in the vegetable fat composition.

In connection with the above embodiment, it should be noted that the amount of the first base added in the base adding step may be calculated from the percentage of free fatty acids in the vegetable fat composition. This percentage of free fatty acids may be estimated or calculated, or a combination of measured data and estimations. Furthermore, measurements may also include e.g. measurements of a pH-value in the vegetable fat composition, e.g. by measuring a pH-value in a water phase extracted from the vegetable fat composition.

According to an embodiment, the amount of the first base added to the vegetable fat composition in the first neutralization step is found by measuring and/or estimating the concentration in percent by weight of free fatty acids in the vegetable fat composition as a first free fatty acid concentration; then calculating a second free fatty acid concentration as by adding between 0.3 and 0.9, such as 0.6, to the numeric value of the first free fatty acid concentration; then calculating an amount of the first base equivalent to the calculated second free fatty acid concentration. Alternatively, the concentration of other acids may be incorporated, so that the concentration of acids replaces the concentration of free fatty acids. As an example, the first free fatty acid concentration may e.g. be measured and/or estimated to be 9.5 percent by weight. Then the second free fatty acid concentration may be calculated by adding e.g. 0.6 according to the above to the numeric value of the first free fatty acid concentration, i.e. adding 0.6 to 9.5, thereby obtaining a second free fatty acid concentration of 10.1 percent. From this the amount of equivalent first base may be calculated.

According to an embodiment of the invention, the amount of the first base that is added to the vegetable fat composition in the base adding step is to between 1 g and 500 g, such as between 5 g and 50 g, such as between 11 g and 22 g for each kilogram of the vegetable fat composition, such as between 14.7 g and 18.4 g.

The above mentioned amounts of the first base may e.g. be added as a 50 w/w aqueous solution of e.g. NaOH. Then, the above amounts correspond to between 2 g and 1000 g, such as between 10 g and 100 g, such as between 22 g and 44 g for each kilogram of the vegetable fat composition, such as between 27 g and 39 g for each kilogram of the vegetable fat composition, such as between 29.4 g and 36.8 g. It should be noted, however, that for different batches of vegetable fat compositions, the amount of free fatty acids may vary. Therefore, the amount of first base added to the vegetable fat composition may vary accordingly, and the above mentioned amounts of the first base may cover various concentrations of free fatty acids according to the above embodiment.

According to an embodiment of the invention, the second base comprises an aqueous solution of NaOH.

Alternatively, the second base may comprise NaOH (sodium hydroxide) in another form, such as in crystalline form, or the second base may comprise other suitable bases in suitable forms, such as aqueous solutions. Such other suitable bases may preferably be foodstuff-compatible strong bases, and may include KOH (potassium hydroxide), or lithium hydroxide (LiOH), or lithium carbonate (Li2CO3), or calcium hydroxide (Ca(OH)2), or barium hydroxide (Ba(OH)2), sodium carbonate (Na2CO3), sodium bicarbonate (NaHCO3), or other suitable bases.

According to an embodiment of the invention, the second base comprises a 50% w/w aqueous solution of NaOH.

Alternatively, the concentration of the second base may be between 5 and 90% w/w, such as between 10 and 70% w/w, such as between 15 and 65% w/w, such as between 15 and 60% w/w, such as between 15 and 55% w/w, preferably between 20 and 50% w/w.

According to an embodiment of the invention, the molar amount of the second base added to the first fraction in the second neutralization step is between 0.5 and 3 times the molar amount of the free fatty acids in the first fraction, such as between 0.8 and 2 times the molar amount of the free fatty acids in the first fraction, such as between 1 and 2 times the molar amount of the free fatty acids in the first fraction, such as between 1.2 and 1.4 times the molar amount of the free fatty acids in the first fraction, such as 1.3 times the molar amount of the free fatty acids in the first fraction.

According to an embodiment, the amount of the second base added to the first fraction in the second neutralization step is found by measuring and/or estimating the concentration in percent by weight of free fatty acids in the first fraction as a first free fatty acid concentration; then calculating a second free fatty acid concentration as by adding between 0.3 and 0.9, such as 0.6, to the numeric value of the first free fatty acid concentration; then calculating an amount of the second base equivalent to the calculated second free fatty acid concentration. Alternatively, the concentration of other acids may be incorporated, so that the concentration of acids replaces the concentration of free fatty acids. As an example, the first free fatty acid concentration may e.g. be measured and/or estimated to be 9.5 percent by weight. Then the second free fatty acid concentration may be calculated by adding e.g. 0.6 according to the above to the numeric value of the first free fatty acid concentration, i.e. adding 0.6 to 9.5, thereby obtaining a second free fatty acid concentration of 10.1 percent. From this the amount of equivalent second base may be calculated.

For instance, the amount of the second base added to the first fraction may be calculated from the percentage of free fatty acids in the first fraction.

According to an embodiment of the invention, the amount of the second base that is added to the first fraction in the second neutralization step is between 0.1 and 2 for each kilogram of vegetable fat composition provided, such as between 0.45 g and 0.9 g, such as between 0.6 g and 0.75 g.

The above mentioned amounts of the second base may e.g. be added as a 50% w/w aqueous solution of e.g. NaOH. Then, the above amounts correspond to between 0.2 and 4 for each kilogram of vegetable fat composition provided, such as between 0.9 g and 1.8 g, such as between 1.2 g and 1.5 g.

According to an embodiment of the invention, the soap separation step comprises
   centrifuging the base added vegetable fat composition with the saponified free fatty acids so as to separate the saponified free fatty acids from the base added vegetable fat composition.

By centrifuging the saponified free fatty acids from the base added vegetable fat composition, use is made of the facts that the saponified free fatty acids are less soluble in the base added vegetable fat composition compared to the free fatty acids, and more soluble in water compared to the free fatty acids, and furthermore that the saponified free fatty acids e.g. dissolved in water has a different specific mass than the base added vegetable fat composition.

According to an embodiment of the invention, the soap separation step comprises
   washing the base added vegetable fat composition.

This may preferably be washing with water. Furthermore, in one embodiment the base added vegetable fat composition is washed twice, or several times. Again, advantage is taken of the fact that the saponified free fatty acids has an increased solubility in water and decreased solubility in the base added vegetable fat composition compared to the free fatty acids.

Preferably, the washing is preferably performed once or several times after the centrifuging of the base added vegetable fat composition, i.e. the washing is subsequent to the centrifugation.

According to an embodiment of the invention, soap separation step comprises
   drying the base added vegetable fat composition.

By drying of the base added vegetable fat composition is according to one embodiment meant that the water content is lowered. According to one embodiment the drying of the base added vegetable fat composition is performed after washing the base added vegetable fat composition. By adjusting the water content of the base added vegetable fat composition to the correct level, it may be secured that the base added vegetable fat composition is adapted by the process steps to be transesterified by transesterification enzymes, while maintaining a satisfactory and economically cost-effective lifetime of the enzymes, while at the same time minimizing the production of diglycerides, thereby avoiding to render the valuable transesterified vegetable fat composition less valuable. Furthermore, by drying the base added vegetable fat composition, the shelf lifetime of this base added vegetable fat composition, the second fraction, the transesterified first fraction, and/or any other fractions or products thereof may be extended. This could e.g. be due to prevention or inhibition of hydrolysis due to low water content. Even further, efficiency of bleaching steps of such fats is increased significantly, e.g. due to prevention of the bleaching earth agglomerating due to water content.

Preferably, the drying is performed subsequent to the washing of the base added vegetable fat composition, which is preferably performed after the centrifugation of the base added vegetable fat composition.

According to an embodiment of the invention, the first acid comprises citric acid.

Preferably, the first acid is a citric acid, in the form of e.g. an aqueous solution or in solid or crystalline form. Alternatively, the first acid may include other acids, such as isocitric acid, aconitic acid, and propane-1,2,3-tricarboxylic acid (tricarballylic acid, carballylic acid), or another weak organic acid, such as oxalic acid or acetic acid, or other weak acids.

According to an embodiment of the invention, the first acid comprises an aqueous solution of citric acid in a concentration of between 1 and 90% w/w, such as between 5 and 80% w/w, such as between 10 and 60% w/w, such as between 15 and 40% w/w, such as between 15 and 30% w/w, such as between 18 and 25% w/w, such as 20% w/w.

According to an embodiment of the invention, the amount of the first acid that is added to the first fraction is between 10 g and 200 g per 1000 kilogram of the first fraction, such as between 20 g and 100 g, such as between 67 g and 60 g, such as 65 g.

This may e.g. be added as a 20% w/w aqueous solution of an acid, such as e.g. citric acid. The above amounts then correspond to between 50 g and 1000 g per 1000 kilogram of the first fraction, such as between 100 g and 500 g, such as between 200 g and 300 g, such as 250 g. However, the amount of the first acid may also be larger or smaller. It should be noted that adding an excess amount of the first base may only result in material waste of the first base, i.e. the amount of the first base may in some embodiments not need specific adjustment when exceeding a threshold value corresponding to a satisfactory conversion of saponified free fatty acids into free fatty acids.

According to an embodiment of the invention, the first acid transforms any residual saponified free fatty acids in the reduced vegetable fat composition into free fatty acids.

An advantage of the above embodiment is that the fractionation step may be performed in an optimized way without clogging of fractionation filters, which may lead to lower fractionation capacity or to halting the fractionation completely to exchange or clean such soap residue clogged filters. Therefore, it is an advantage to transform or convert residual saponified free fatty acids, i.e. small amounts of saponified free fatty acids, into free fatty acids. By residual or small amounts of saponified free fatty acids is meant low concentrations e.g. in relation to the total volume, or to the initial amount of free fatty acids, i.e. the amount of free fatty acids before the soap separation step, such as in the base added vegetable fat composition.

According to an embodiment of the invention, residues of citric acid are removed by adding the second base.

An advantage of the above embodiment is that the lifetime of the enzymes is increased by removing the citric acid which is left-over after the conversion or transformation of the residues of saponified free fatty acids into free fatty acids. Thereby, it is facilitated that the fractionation can be performed effectively without filter clogging, while at the same time having a sufficiently long lifetime of the enzymes. By removing an acid may in an embodiment be meant transforming or converting the acid into a non-acid, such as a salt.

According to an embodiment of the invention, the concentration of citric acid in the neutralized first fraction is lower than 10 ppm by weight, such as lower than 5 ppm by weight, such as lower than 2 ppm by weight, such as lower than 1 ppm by weight, such as lower than 0.75 ppm by weight, such as lower than 0.5 ppm by weight, such as lower than 0.3 ppm by weight, such as lower than 0.2 ppm by weight, such as lower than 0.1 ppm by weight, such as lower than 0.05 ppm by weight, such as lower than 0.3 ppm by weight, such as lower than 0.2 ppm by weight, such as lower than 0.01 ppm by weight, after adding the second base.

By the above mentioned concentrations of citric acid is to be understood concentrations of citric acid or dissolved citric acid, i.e. as opposed to a citric acid in the form of a salt.

According to an embodiment of the invention, the concentration of acids in the neutralized first fraction is lower than 10 mmol/100 g of the first fraction, such as lower than 5 mmol/100 g of the first fraction, such as lower than 2 mmol/100 g of the first fraction, such as lower than 1 mmol/100 g of the first fraction, such as lower than 0.75 mmol/100 g of the first fraction, such as lower than 0.5 mmol/100 g of the first fraction, such as lower than 0.3 mmol/100 g of the first fraction, such as lower than 0.2 mmol/100 g of the first fraction, such as lower than 0.1 mmol/100 g of the first fraction, such as lower than 0.05 mmol/100 g of the first fraction, such as lower than 0.3 mmol/100 g of the first fraction, such as lower than 0.2 mmol/100 g of the first fraction, such as lower than 0.01 mmol/100 g of the first fraction, after second neutralization.

By the above mentioned concentrations of acids is to be understood concentrations of acids or dissolved acids, i.e. as opposed to acids in the form of salts. Therefore, the above mentioned concentrations may well be understood in relation to a pH-value in the neutralized first fraction, or in a water phase extracted from the neutralized first fraction.

According to an embodiment of the invention, the neutralized first fraction is completely neutralized.

By a neutralized first fraction may in one embodiment be meant that if a water phase is extracted from the vegetable fat of the neutralized first fraction, said water phase is neutralized, e.g. with respect to pH-value or with respect to the concentration of free fatty acids. It should be understood, however, that an excess amount of first base may be added such that the term completely neutralized should be understood as the extracted water phase having a neutral or basic pH-value or that the saponification of the free fatty acids is complete or at least substantially complete, such as at least 80% w/w, such as at least 90% w/w, such as at least 95% w/w, such as at least 98% w/w, such as at least 99% w/w. However, such excess amounts of the first base may result in a loss of fat from the neutralized first fraction, and therefore such excess amounts of first base should, if possible, be minimized.

According to an embodiment of the invention, the enzymes with transesterification activity are 1,3-specific enzymes.

According to a further embodiment, the enzymes are lipase, such as a 1,3-specific lipase. Examples of such 1,3-specific lipases may e.g. be lipases of *Rhizopus delemar, Mucor miehei, Aspergillus niger, Rhizopus arrhizus, Rhizopus niveus, Mucor javanicus, Rhizopus javanicus, Rhicomucor miezei*, and *Rhizopus oxyzae*. Other 1,3-specific lipases may also be used.

According to an embodiment of the invention, an additional step of drying the neutralized vegetable fat is performed after the second neutralization step and before the enzymatic transesterification step.

According to an embodiment it is meant by drying that the water content is lowered.

According to an embodiment of the invention, the process comprises an additional step of removing karitene.

The additional step of removing karitene is to be understood as removing karitene from a vegetable fat or fraction thereof in the method according to the invention. This step of removing karitene may advantageously be performed after the soap residue removal step and before the fractionation step, or after the fractionation step and before the second neutralization step. I.e. the karitene is preferably removed from the neutralized vegetable fat composition or from the first fraction. The karitene may be removed by various suitable ways.

The invention furthermore relates to a system for processing a vegetable fat composition according to any of the above described embodiments, the system comprising a common processing line, a first processing line, and a first output, the common processing line comprising a free fatty acid removal apparatus, and a separator unit for performing the separation of said separation step, the first output being adapted for said first fraction to be fed into, and being connected to said separation unit, the first processing line being adapted for said second fraction to be fed into, and being connected to said separation unit, said first processing line comprising a second base inlet for adding said second base in said second neutralization step, and a reaction system for performing transesterification in said enzymatic transesterification step.

It should be noted that the term processing line refers to a system, sub-system, and/or line of processing apparatuses or units, which together forms a processing line. These may preferably be connected directly as a continuous or unbroken processing line allowing the output of a given processing apparatus or unit to deliver its output to the next apparatus or unit, such as connection by piping allowing a liquid or partially liquid vegetable fat or oil to be moving by pumping. However, a processing line may also be understood as being isolated apparatuses, units, or processing sub-lines, where the output of a given apparatus or unit is manually moved to the next apparatus, unit, or sub-line. Furthermore, the above apparatuses or units may operate continuously, or batch-wise or as a combination thereof. Although such a processing line may preferably be located in the same facility, it is to be understood that it may extend over several facilities, with intermediate products being transported between such facilities. Also, a processing line may include one or more storage tanks for storage of intermediate products. In other words, a processing line may be understood as a series of processing equipment adapted for performing processing of a vegetable fat composition according to an embodiment of the invention.

The separator unit is preferably a fractionation unit for performing a fractionation in accordance with any embodiment of the invention, i.e. preferably adapted to perform fractional crystallization.

According to an embodiment of the invention, said free fatty acid removal apparatus comprises a first base inlet for adding said first base in said base adding step, a soap separator for separating saponified free fatty acids in said soap separation step, and a first acid inlet for adding said first base in said soap residue removal step.

According to an embodiment of the invention, the free fatty acid removal apparatus comprises a distillation unit for separating free fatty acids in said first neutralization step.

According to an embodiment of the invention, said first output forms part of a second processing line, said second processing line comprising a mixing unit for mixing said second fraction with a palm oil mid fraction to obtain a second cocoa butter equivalent.

By mixing said second fraction with a palm oil mid fraction, the valuable second cocoa butter equivalent may be obtained.

According to an embodiment of the invention, said first processing line furthermore comprises a mixing unit for mixing said transesterified first fraction with a palm oil mid fraction to obtain a first cocoa butter equivalent.

By mixing said transesterified first fraction with a palm oil mid fraction, the valuable first cocoa butter equivalent may be obtained.

Moreover the invention relates to a method of processing shea fat and the process comprises the step of neutralizing the processed fat prior to a transesterification step. Thereby, it is possible to increase the cost efficiency of the overall transesterification process.

According to an embodiment of the invention, the neutralization of the shea fat is performed subsequent to a soap residue removal step.

It is in particular advantageous to apply the neutralization after acid has been added to remove soap residues in the shea fat process stream.

According to an embodiment of the invention, said neutralized first fraction is neutralized prior to said enzymatic transesterification step according to the method of any of the above embodiments.

FIGURES

The invention will be described in the following with reference to the figures in which.

DETAILED DESCRIPTION

Figure 1:
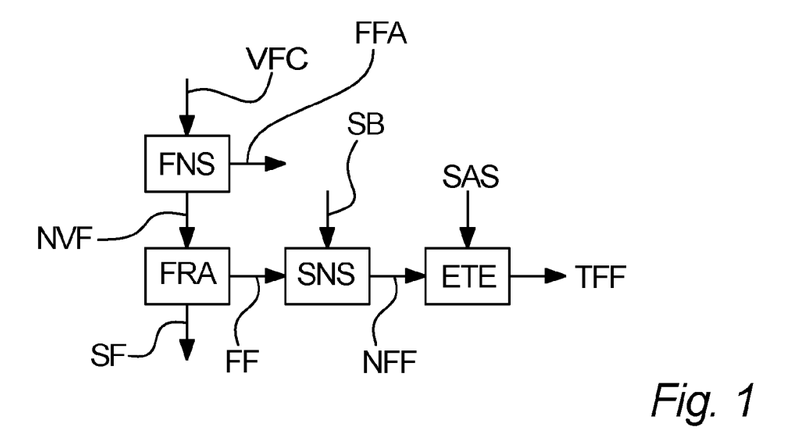
FIG. 1 illustrates a method according to an embodiment of the invention.

Referring to FIG. 1, an embodiment of the invention is illustrated. According to the embodiment, a process for treatment of a vegetable fat composition VCF comprising a number of steps is provided. First, the vegetable fat composition VCF is provided to the process. Then, the free fatty acids FFA are removed in a first neutralization step FNS, whereby a neutralized vegetable fat NVF is obtained. When the aforementioned steps have been performed, the neutralized vegetable fat composition NVF is separated in a separation step FRA, preferably a fractionation, into a first fraction FF rich in StOO and/or OOO and a second fraction SF rich in StOSt. A second base SB is added to the first fraction FF, thereby obtaining a neutralized first fraction NFF. This neutralized first fraction NFF is fed into a reaction system comprising enzymes with transesterification activity to perform an enzymatic transesterification ETE, before finally obtaining a transesterified first fraction TFF from the reaction system.

Figure 2:
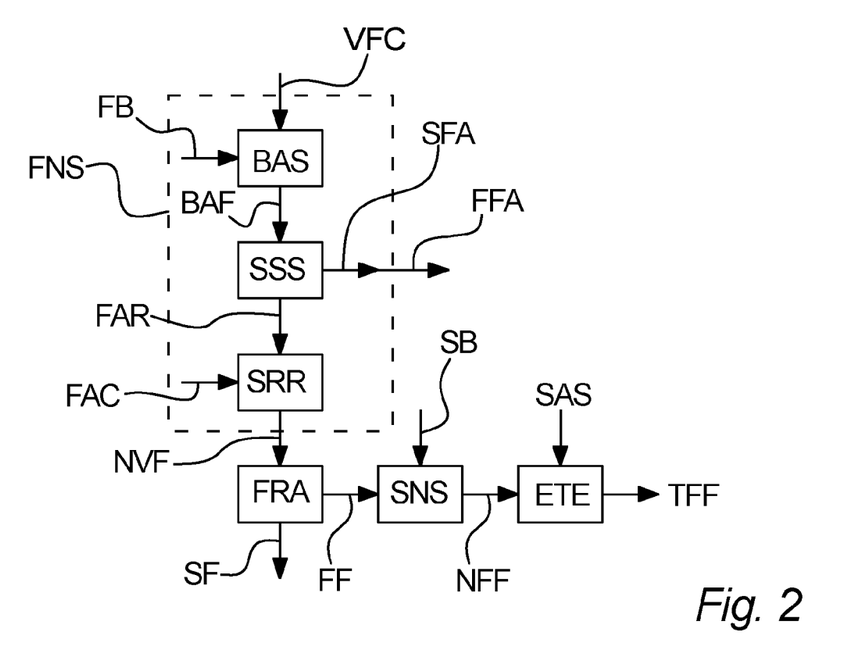
FIG. 2 illustrates a method according to an embodiment of the invention.

The first neutralization step FNS of the above embodiment may according to another embodiment comprise a number of sub-steps, which are illustrated on FIG. 2. In a base adding step BAS, a first base FB is added to the vegetable fat composition VCF so as to saponify free fatty acids and obtaining a base added vegetable fat composition BAF. The free fatty acids FFA are removed by separating the saponified free fatty acids SFA from the base added vegetable fat composition BAF, e.g. by centrifugation and/or washing followed by optional drying of the base added vegetable fat composition BAF. Finally, a first acid FAC is added to the free fatty acid reduced vegetable fat FAR so as to convert or transform residues of saponified free fatty acids into free fatty acids.

Figure 3:
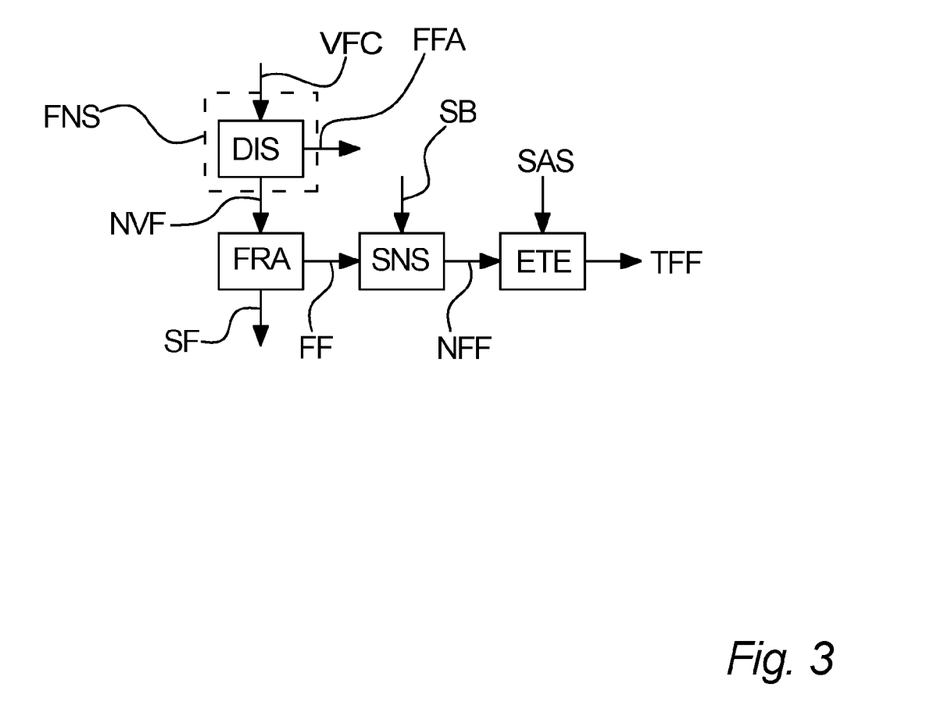
FIG. 3 illustrates a method according to an embodiment of the invention.

Now referring to FIG. 3, an embodiment is illustrated where a distillation step DIS is used as the first neutralization step FNS. Here, the vegetable fat composition VFC is distilled in the distillation step DIS so as to remove free fatty acids FFA and thereby obtaining a neutralized vegetable fat composition NVF. This neutralized vegetable fat composition NVF is then processed according to the aforementioned embodiments.

Figure 4:
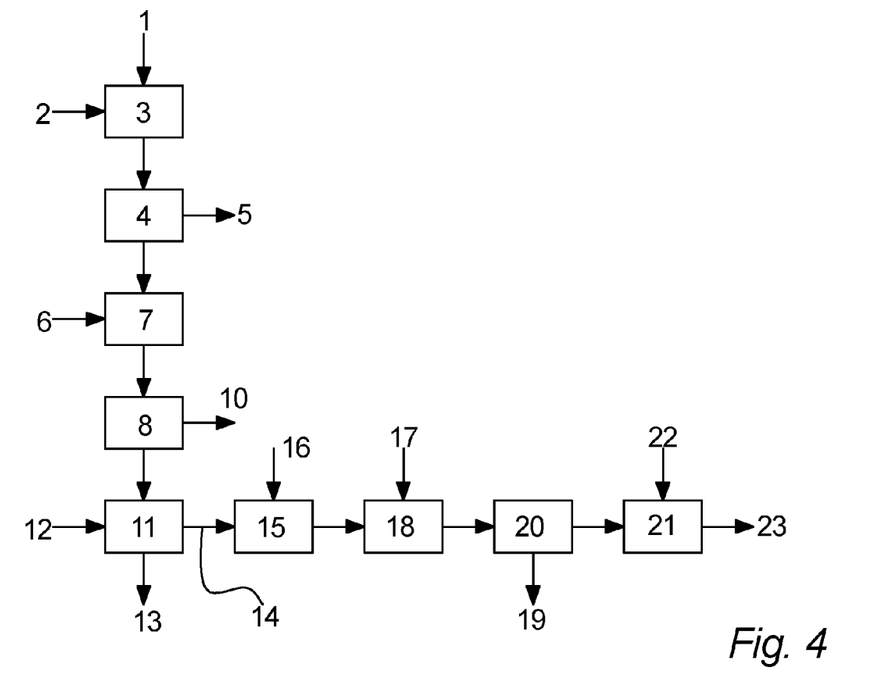
FIG. 4 illustrates a method according to an embodiment of the invention.

Now referring to FIG. 4, an embodiment of the invention is illustrated. At first a vegetable fat composition being shea fat 1 is provided. The shea fat 1 may be refined and/or purified before being provided to the process of this embodiment. At first, an amount of a first base being a first sodium hydroxide aqueous solution 2 is added to the shea fat 1. Alternatively, another base may be added, e.g. as an aqueous solution. The first sodium hydroxide aqueous solution 2 reacts with free fatty acids in the shea fat 1 to saponify these free fatty acids, i.e. by transforming these free fatty acids into soaps. This reaction may be referred to as the base adding step 3. This base adding step 3 increases the aqueous solubility of the free fatty acids in water. The saponified free fatty acids or soaps 5 are then removed by a soap separation step 4. This step 4 comprises centrifuging the shea fat 1 to separate the soap 5 and subsequent washing the shea fat 1 with water one or several times. Finally, the shea fat 1 is dried, i.e. the water content of the shea fat 1 is lowered. Then an amount of a first acid being an aqueous solution of citric acid 6 is added to the shea fat 1, so as to perform a conversion or transformation of the residual saponified free fatty acids in the shea oil 1, which were not removed by the centrifugation and washing 4, into free fatty acids. The shea fat 1 is then subjected to a karitene removal step 8, where the karitene 10 can be removed. Then the shea fat 1, from which karitene 10 has been separated, is subjected to a fractionation 11 into a first fraction being an olein fraction 14, which is rich in StOO and/or OOO, and a second fraction being a stearin fraction 13, which is rich in StOSt. This may be done by adding a solvent 12, such as hexane, heating the shea fat 1 to well above the melting point, and the separate the stearin fraction 13 from the olein fraction 14 by crystallization. It is to be understood that the solvent 12 is removed from the fractions 13, 14 after the fractionation 11. Due to the low concentration of free fatty acids in the shea fat 1, which is fractionated 11, this fractionation 11 may be performed effectively. If the content of free fatty acids is too high, the crystallization properties of the shea fat 1, from which karitene has been separated, may be significantly altered, and the fractionation 11 becomes ineffective. Therefore, by removing the free fatty acids by the base adding step 3, the fractionation is made possible in relation to the crystallization properties. Furthermore, since the shea fat 1 is made soap free by the soap separation step 4 and the subsequent soap residue removal step 7 of adding citric acid 6, the fractionation 11 may be performed effectively without clogging of filters or other equipment used in the fractionation process 11. The olein fraction 14 is then subjected to a second neutralization step 15, where a second base being a second sodium hydroxide aqueous solution 16 is added. This second neutralization 15 lowers the concentration of acids, such as citric acid 6 or other acids, in the olein fraction 14. Finally, the olein fraction 14 is subjected to a bleaching step 18 wherein an amount of bleaching earth 17 is added to the olein fraction 14. The bleaching earth with impurities 19, such as saponified free fatty acids and other impurities, are subsequently removed by filtering 20. The neutralized olein fraction 14 is then inputted into an enzymatic transesterification process 21, where it is put into contact with enzymes having transesterification activity and methyl stearate 22 added to the enzymatic transesterification step 21. Thereby, a transesterified shea olein 23 is obtained which has a significantly increased content of StOSt compared to the shea olein fraction 14 obtained from the fractionation 11.

Figure 5:
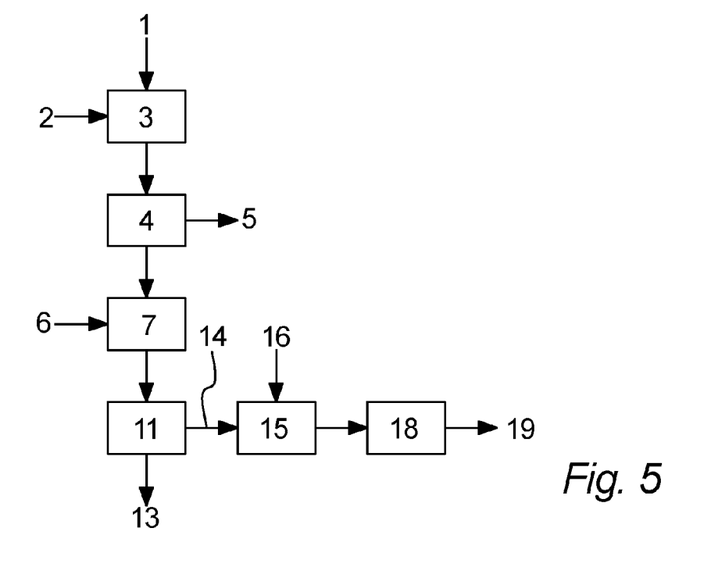
FIG. 5 illustrates a method according to an embodiment of the invention.

Referring to FIG. 5, an embodiment of the invention is illustrated. First, a vegetable fat composition 1 is provided to the process. A first base 2 is added to the vegetable fat composition 1, whereby a first neutralization 3 is obtained, transforming free fatty acids in the vegetable fat composition 1 into soaps 5, i.e. saponified free fatty acids. These soaps 5 are separated from the vegetable fat composition 1 by a soap separation step 4. The soap separation step may e.g. comprise steps of centrifugation, washing with water, and drying. However, residues of soap 5 may remain in the vegetable fat 1. These residues of soap 5 are converted into free fatty acids by adding a first acid 6 to the vegetable fat 1. After this soap residue removal step 7, the vegetable fat 1 is substantially free of soaps, and have only a small concentration of free fatty acids. Such vegetable fats 1 are suitable for fractionation 11, and the vegetable fat 1 is therefore fractionated 11 into a stearin fraction 13 having a high melting point and an olein fraction 14 having a low melting point, i.e. the olein fraction 14 has a relatively low melting point relative to the stearin fraction 13. The olein fraction 14 may be rich in StOO and/or OOO while the stearin fraction 13 may be rich in StOSt. Then a second base 16 is added to the olein fraction 13 to facilitate a second neutralization 15, which neutralizes the first acid 6 and/or other acids in the olein fraction. Finally the olein fraction 13 is subjected to an enzymatic transesterification 18 by putting the olein fraction 13 into contact with enzymes having transesterification activity. The enzymatic transesterification process 18 increases the relative content of StOSt, the longer the contact time between the vegetable oil and the enzymes, the higher the degree of conversion into StOSt may be realized in the transesterified vegetable oil 19.

Figure 7:
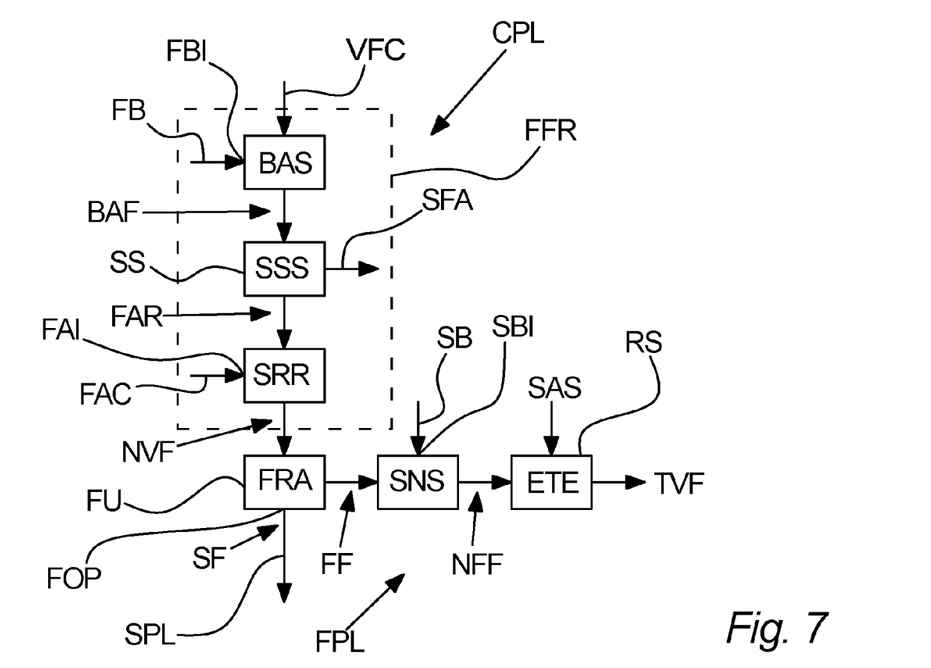
FIG. 7 illustrates a system according to an embodiment of the invention.

Referring to FIG. 7, an embodiment of the invention is illustrated. According to this embodiment a system for processing a vegetable fat composition VFC according any of the above described embodiments is described. The system comprises a common processing line CPL, a first processing line FPL, and a second processing line SPL. The common processing line CPL comprises a free fatty acid removal apparatus FFR. This free fatty acid removal apparatus may in one embodiment comprise a first base inlet FBI for adding said first base FB in said base adding step BAS, a soap separator SS for separating saponified free fatty acids SFA in said soap separation step SSS, and a first acid inlet FAI for adding said first acid FAC in said soap residue removal step SRR. The common processing line CPL furthermore comprises a fractionation unit FU for performing the fractionation of said fractionation step FRA. The first processing line FPL, which is adapted for said first fraction FF to be fed into, is connected to said fractionation unit FU. The second processing line SPL, which is adapted for said second fraction SF to be fed into, is connected to said fractionation unit FU. The second processing line SPL comprises a second base inlet SBI for adding said second base SB in said second neutralization step SNS, and a reaction system RS for performing transesterification in said enzymatic transesterification step ETE.

Figure 8:
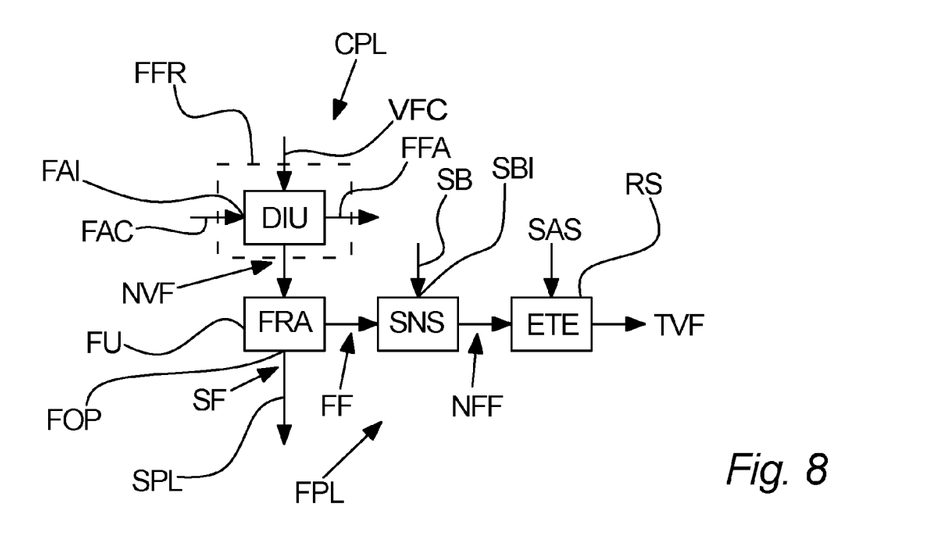
FIG. 8 illustrates a system according to an embodiment of the invention.

Referring to FIG. 8, another embodiment of the invention is illustrated. Here, the vegetable fat composition VFC is processed in a free fatty acid removal apparatus FFR in a common processing line CPL, where the free fatty acid removal apparatus FFR comprises a distillation unit DIU for distilling the vegetable fat composition VFC in the distillation step DIS to obtain separated free fatty acids FFA and a neutralized vegetable fat composition NVF. The neutralized vegetable fat composition NVF may then be processed in processing equipment according to the aforementioned embodiments.

Example 1

20 kilograms (kg) of refined shea oil (shea fat) is provided. One half of the shea oil (first half) is separated from the other half (second half) to give two chemically equivalent shea oil parts.

Example 2

10 kilograms (kg) of shea oil (first half) from example 1 is provided to the process. 294 g of 50% w/w aqueous solution of NaOH is added to the shea oil (first neutralization), whereafter 1.73 kg of soaps has been separated from the shea oil. Thereafter, 2.50 g of a 20% w/w aqueous solution of citric acid has been added to the shea oil. In the following fractionation, 4.37 kg of shea olein and 4.19 kg of shea stearin has been obtained. 12 g of 50% w/w aqueous solution of NaOH is added to the 4.37 kg of shea olein (second neutralization). Finally, the neutralized shea olein is bleached by bleaching earth to give a first shea olein portion.

Example 3

The second half of the shea oil from example 1 is subjected to the procedure according to example 2 similar to the first half, only leaving out the second neutralization step. Thereby a second shea olein portion is obtained.

Example 4

Figure 6:
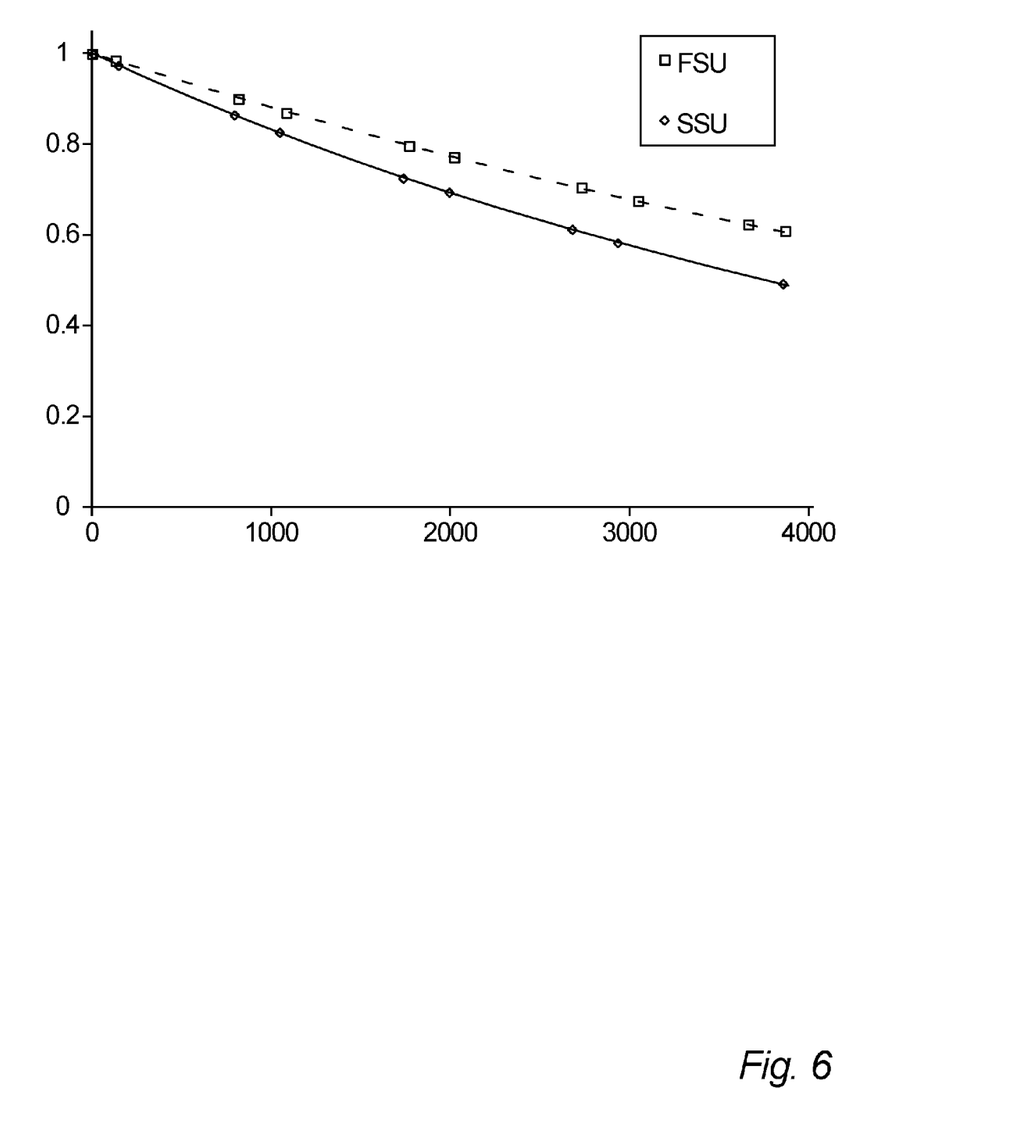
FIG. 6 illustrates the half-value mass of enzymes according to an embodiment.

The conversion efficiency of the first shea olein portion from example 3 and the second shea olein portion from example 2 is measured, by measuring the composition of methyl esters in the product by a GC (gas chromatography) method. The amount of olein that has been processed by the transesterification enzymes, i.e. which has been converted, has been measured for the first shea olein portion in a first transesterification setup FSU, and for the second shea olein portion in a second transesterification setup SSU, where the second transesterification setup SSU is identical to the first transesterification setup FSU. The normalized conversion-efficiency for the two setups is shown in FIG. 6. From the data a half-value mass is determined, i.e. the amount of shea olein that can be processed before the conversion rate is reduced by half. These half-value masses are 5398 and 3787 mass units of olein per mass unit of enzymes for the first setup FSU and second setup SSU, respectively. I.e. this experiment shows an increase of 43% in the half-value masses in the first setup FSU compared to the second setup SSU. Although the absolute half-life of the enzymatic activity in the two setups FSU, SSU may change depending on the scaling, the ratio between the two half-value masses is concluded to be valid for industrial scale production.

LIST OF REFERENCE NUMERALS

VFC. Vegetable fat composition
FB. First base
FNS. First neutralization step
NVF. Neutralized vegetable fat composition
SSS. Soap separation step
SFA. Saponified free fatty acids
FAR. Reduced vegetable fat composition
FAC. First acid
SRR. Soap residues removal step
FRA. Fractionation step
FF. First fraction
SF. Second fraction
SNS. Second neutralization step
NFF. Neutralized first fraction
ETE. Enzymatic transesterification step
SAS. Stearic acid source
TFF. Transesterified first fraction
FFA. Free fatty acids
DIS. Distillation step
BAS. Base addition step
BAF. Base added vegetable fat composition
FBI. First base inlet
CPL. Common processing line
FPL. First processing line
SPL. Second processing line
FAI. First acid inlet
FU. Fractionation unit
SBI. Second base inlet
RS. Reaction system
FFR. Free fatty acid removal apparatus
1. Shea fat
2. First sodium hydroxide solution
3. Base adding step
4. Centrifugation and washing
5. Saponified free fatty acids
6. Citric acid
7. Conversion of saponified free fatty acids into free fatty acids
8. Karitene removal step
10. Karitene
11. Fractionation
12. Solvent
13. Stearin fraction
14. Olein fraction
15. Second neutralization step
16. Second sodium hydroxide solution
17. Bleaching earth
18. Bleaching step
19. Bleaching earth and impurities
20. Filtering
21. Enzymatic transesterification
22. Methyl stearate
23. Enzymatic transesterified shea olein

The invention claimed is:

1. A method for processing a vegetable fat composition (VFC), the method comprising the steps of:
   providing the vegetable fat composition (VFC);
   in a first neutralization step (FNS), separating free fatty acids from the vegetable fat composition (VFC) thereby obtaining a neutralized vegetable fat composition (NVF);
   in a separation step (FRA), separating the neutralized vegetable fat composition (NVF) into a first fraction (FF) rich in StOO and/or OOO and a second fraction (SF) rich in StOSt (where St=stearic acid and O=oleic acid),
   in a second neutralization step (SNS), adding a second base (SB) to the first fraction (FF) thereby obtaining a neutralized first fraction (NFF);
   feeding the neutralized first fraction (NFF) and a stearic acid source (SAS) into an enzymatic transesterification step (ETE) to transesterify the neutralized first fraction (NFF) by using enzymes with 1,3-specific transesterification activity thereby obtaining a transesterified first fraction (TFF).

2. The method according to claim 1, wherein the first neutralization step (FNS) comprises the steps of:
   in a base adding step (BAS), adding a first base (FB) to the vegetable fat composition (VFC) thereby obtaining a base added vegetable fat composition (BAF);
   in a soap separation step (SSS), separating free fatty acids in the form of saponified free fatty acids (SFA) from the base added vegetable fat composition (BAF) thereby obtaining a reduced vegetable fat composition (FAR) having a reduced content of free fatty acids; and
   in a soap residue removal step (SRR), adding a first acid (FAC) to the reduced vegetable fat composition (FAR) thereby obtaining the neutralized vegetable fat composition (NVF).

3. The method according to claim 1, wherein the first neutralization step (FNS) comprises a distillation step (DIS) of distilling free fatty acids (FFA) from the vegetable fat composition (VFC) thereby obtaining a neutralized vegetable fat composition (NVF).

4. The method according to claim 3, wherein first neutralization step (FNS) furthermore comprises adding a first acid (FAC) to the vegetable fat composition (VFC) before the distilling step (DIS).

5. The method according to any of claim 3, wherein the first neutralization step (FNS) furthermore comprises bleaching the vegetable fat composition (VFC) before the distilling step (DIS).

6. The method according to claim 1, wherein the vegetable fat composition (VFC) comprises shea fat.

7. The method according to claim 1, wherein the neutralized first fraction (NFF) is bleached.

8. The method according to claim 1, wherein the separation step (FRA) involves a fractionation step (FRA).

9. The method according to claim 2, wherein the soap separation step (SSS) comprises:

centrifuging the base added vegetable fat composition (BAF) with the saponified free fatty acids (SFA) to separate the saponified free fatty acids (SFA) from the base added vegetable fat composition (BAF).

10. The method according to claim 2, wherein the soap separation step (SSS) comprises:
    washing the base added vegetable fat composition (BAF).

11. The method according to claim 2, wherein the soap separation step (SSS) comprises:
    drying the base added vegetable fat composition (BAF).

12. The method according to claim 2, wherein the first acid (FAC) comprises citric acid.

13. The method according to claim 2, wherein the first acid (FAC) transforms any residual saponified free fatty acids in the reduced vegetable fat composition (FAR) into free fatty acids.

14. The method according to claim 2, wherein the first acid (FAC) comprises an aqueous citric acid, wherein residues of citric acid are removed by adding the second base (SB).

15. The method according to claim 1, wherein the neutralized first fraction (NFF) is completely neutralized.

16. The method according to claim 1, wherein the enzymes with transesterification activity are 1,3 specific enzymes.

17. The method according to claim 1, wherein an additional step of drying the neutralized vegetable fat (NFV) is performed after the second neutralization step (SNS) and before the enzymatic transesterification step (ETE).

18. The method according to claim 1, wherein the process comprises an additional step of removing karitene.

19. A system for processing a vegetable fat composition (VFC) according to claim 1, the system comprising a common processing line (CPL), a first processing line (FPL), and a first output (FOP),
wherein the common processing line (CPL) comprises:
    a free fatty acid removal apparatus (FFR); and
    a separator unit (FU) for performing the separation of said separation step (FRA),
wherein the first output (FOP) being adapted for a first fraction (FF) to be fed into, and being connected to the separation unit (FU),
wherein the first processing line (FPL) being adapted for a second fraction (SF) to be fed into, and being connected to the separation unit (FU),
wherein the first processing line (FPL) comprises:
    a second base inlet (SBI) for adding a second base (SB) in a second neutralization step (SNS); and
    a reaction system (RS) for performing transesterification in an enzymatic transesterification step (ETE).

20. The system for processing a vegetable fat composition (VFC) according to claim 19, wherein the free fatty acid removal apparatus (FFR) comprises:
    a first base inlet (FBI) for adding a first base (FB) in the base adding step (BAS);
    a soap separator (SS) for separating saponified free fatty acids (SFA) in the soap separation step (SSS); and
    a first acid inlet (FAI) for adding a first acid (FAC) in a soap residue removal step (SRR).

21. The system for processing a vegetable fat composition (VFC) according to claim 19, wherein the first output (FOP) forms part of a second processing line (SPL), wherein the second processing line (SPL) comprises:
    a mixing unit to mix a first fraction (FF) with a palm oil mid fraction to obtain a cocoa butter equivalent.

22. The system for processing a vegetable fat composition (VFC) according to claim 19, wherein the first processing line (FPL) furthermore comprises:
    a mixing unit to mix a transesterified first fraction (TFF) with a palm oil mid fraction to obtain a cocoa butter equivalent.

23. A method of processing shea fat, wherein the process comprises a step of neutralizing a processed shea fat prior to a transesterification step.

24. The method of processing shea fat according to claim 23, wherein the step of neutralizing the processed shea fat is performed subsequent to a soap residue removal.

25. The method of processing shea fat according to claim 23, wherein a neutralized first fraction (NFF) is neutralized prior to an enzymatic transesterification step (ETE) according to the method of claim 1.

* * * * *